Sept. 23, 1952 C. SCIFORD 2,611,270
AUTOMATIC FUEL GAUGE
Filed June 19, 1951
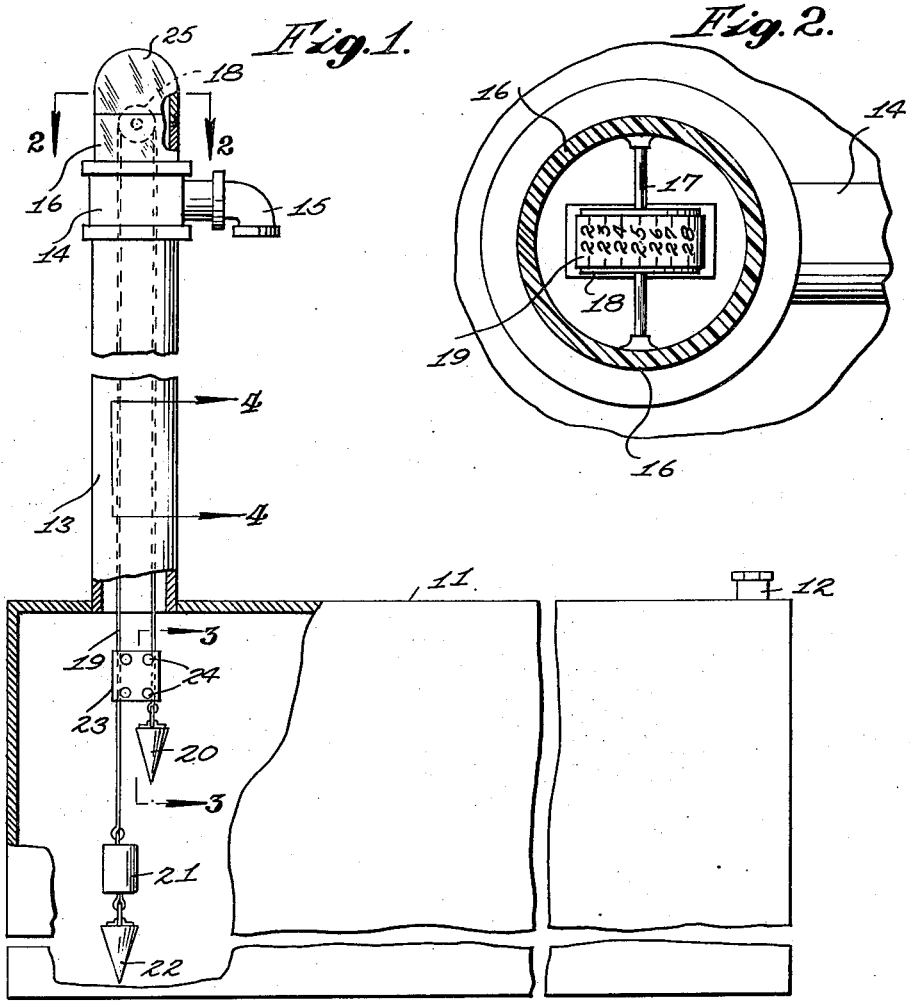
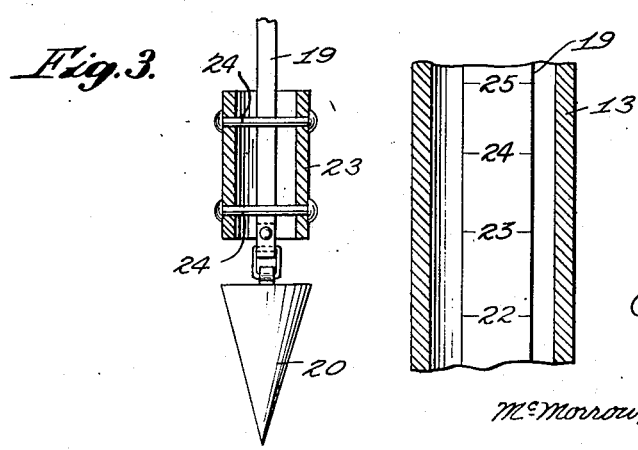
INVENTOR.
CLINTON SCIFORD
BY
McMorrow, Berman & Davidson
ATTORNEYS Patented Sept. 23, 1952

2,611,270

UNITED STATES PATENT OFFICE 2,611,270

AUTOMATIC FUEL GAUGE

Clinton Sciford, Odebolt, Iowa

Application June 19, 1951, Serial No. 232,336

1 Claim. (Cl. 73—321)

This invention relates to liquid level gauges, and more particularly to an improved automatic gauge for indicating the liquid level in underground storage tanks and the like.

A main object of the invention is to provide a novel and improved liquid level gauge which is simple in construction, which is easy to install, which provides accurate readings, and which involves only a few parts.

A further object of the invention is to provide an improved liquid level gauge which is inexpensive to fabricate, which is easy to read, which requires a minimum amount of human supervision, and which is very durable in construction.

Further objects and advantages of the invention will become apparent from the following description and claim, and from the accompanying drawings, wherein:

Figure 1 is a side elevational view, partly in vertical cross-section, of a liquid tank provided with an improved level gauge device constructed in accordance with the present invention;

Figure 2 is an enlarged cross-sectional detail view taken on the line 2—2 of Figure 1;

Figure 3 is an enlarged cross-sectional detail view taken on the line 3—3 of Figure 1;

Figure 4 is an enlarged cross-sectional detail view taken on the line 4—4 of Figure 1.

Referring to the drawings, 11 designates a liquid tank, such as a tank adapted to be disposed with the top wall level with the ground and being adapted to receive a supply of liquid, such as gasoline or other liquid fuel. Adjacent one end thereof the tank 11 is provided with a filler spout 12 through which the liquid may be poured into the tank. Rigidly secured to the top wall of the tank 11 adjacent its other end is a vertical tube 13 communicating with the interior of the tank and provided at its top end with a vent fitting 14 having the open elbow 15, directed downwardly as shown in Figure 1, providing free escape of air or other gas trapped in the tank 11. Secured to the top of the fitting 14 is a transparent sleeve member 16, and journaled in the top end of the sleeve member 16 is the transverse shaft 17 on which is secured the drum or roller 18. It will be understood that the shaft 17 may be rigidly secured in the top end of the sleeve member 16 and the roller 18 may be rotatably mounted thereon, or alternatively, the roller 18 may be secured rigidly to the shaft 17 and the shaft 17 may be rotatable in the sleeve member 16.

Designated at 19 is a flexible metal band, or a flexible band of other suitable material, which is disposed over the drum or roller 18 in the manner shown in Figures 1 and 2. The ends of the band 19 depend downwardly through the tube 13 into the tank 11, and secured to one of the ends is a weight member 20. Secured to the other end of the band is a float 21, and secured to said float is another weight member 22. Designated at 23 is a rectangular sleeve which is slidably engaged around the depending end portions of the band 19, the respective band end portions being slidably retained between the opposite vertical end walls of the sleeve 23 and respective pairs of transverse pins 24, 24 secured in vertically spaced relationship in the front and rear walls of the sleeve 23, the respective pairs of vertically spaced pins 24, 24 serving as spacer means between the depending portions of the band arranged to maintain said depending portions in spaced parallel relationship.

The outwardly facing surface of the band 19 is provided with appropriate calibrations, in the form of a scale of volumetric units, or alternatively, a scale of depth indications, indicating the level of liquid in the tank 11. The float 21 is arranged to move upwardly and downwardly in response to changes in level of liquid in the tank, whereby the calibrations on the band 19 move around the roller 18 and come into view as the relative positions of the weights 20 and 22 shift due to changes in level of the liquid in the tank. It will be understood that when the level in the tank diminishes, the float 21 moves down along with the weight 22, whereas the weight 20 moves upwardly. The rectangular sleeve 23 engages either the float 21 or the weight 20, depending upon which of these elements is uppermost, in accordance with the level of liquid in the tank 11.

Threadedly engaged in the top end of the transparent sleeve 16 is the transparent dome or cap 25 which serves as a cover for the top end of tube 13, but which allows a clear view of the calibrations on the band 19, whereby the liquid level in tank 11 may be read at all times.

While a specific embodiment of an improved liquid level device for tanks has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a tank, a gauge comprising a vertical tube secured to the top wall of the tank and communicating therewith, a roller journaled in the top end of said tube, a calibrated flexible band disposed over said roller, respective weights secured to the ends of said band, a float secured to one of said ends, said one of the ends depending into the tank and said float being arranged to move upwardly and downwardly in response to changes in level of liquid in the tank, a sleeve member slidably engaged around the depending end portions of said band and supported on one of said weights, and spacer means secured in the sleeve member between said depending portions of said band and arranged to maintain said depending end portions in spaced parallel relationship.

CLINTON SCIFORD.

REFERENCES CITED

The following references are of record in the file of this patent:

UNITED STATES PATENTS

| Number | Name | Date |
|---|---|---|
| 572,321 | Van Vleck | Dec. 1, 1896 |
| 2,171,899 | Scheurich | Sept. 5, 1939 |